(12) United States Patent
Johnson et al.

(10) Patent No.: US 11,265,323 B2
(45) Date of Patent: Mar. 1, 2022

(54) FICTITIOUS ACCOUNT GENERATION ON DETECTION OF ACCOUNT TAKEOVER CONDITIONS

(71) Applicant: PAYPAL, INC., San Jose, CA (US)

(72) Inventors: Raoul Christopher Johnson, San Jose, CA (US); Ran Sun, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 609 days.

(21) Appl. No.: 16/190,066

(22) Filed: Nov. 13, 2018

(65) Prior Publication Data

US 2020/0153836 A1    May 14, 2020

(51) Int. Cl.
*H04L 29/06*    (2006.01)
*G06Q 30/00*    (2012.01)

(52) U.S. Cl.
CPC ....... *H04L 63/102* (2013.01); *G06Q 30/0185* (2013.01); *H04L 63/1416* (2013.01)

(58) Field of Classification Search
CPC .............. H04L 63/102; H04L 63/1416; G06Q 30/0185
See application file for complete search history.

(56) References Cited

U.S. PATENT DOCUMENTS

| | | | |
|---|---|---|---|
| 8,856,077 B1 | 10/2014 | Roth et al. | |
| 10,068,235 B1* | 9/2018 | Boates | G06Q 20/4093 |
| 10,230,564 B1* | 3/2019 | Hu | H04L 29/06768 |
| 10,298,598 B1* | 5/2019 | McClintock | H04L 63/145 |
| 10,445,514 B1* | 10/2019 | Brandwine | G06F 21/6209 |
| 10,574,697 B1* | 2/2020 | McClintock | H04L 63/1491 |
| 10,686,834 B1* | 6/2020 | Hitchcock | H04L 63/1466 |
| 10,931,691 B1* | 2/2021 | Kapelevich | G06N 7/005 |
| 2002/0143686 A1* | 10/2002 | Greene | G06Q 40/06 |
| | | | 705/37 |
| 2006/0161982 A1* | 7/2006 | Chari | G06F 21/53 |
| | | | 726/23 |
| 2013/0263226 A1* | 10/2013 | Sudia | G06F 21/60 |
| | | | 726/4 |
| 2016/0164861 A1 | 6/2016 | Treleaven et al. | |

(Continued)

OTHER PUBLICATIONS

NPL Search (InnovationQ) (Year: 2021).*

(Continued)

*Primary Examiner* — Mohammed Waliullah
(74) *Attorney, Agent, or Firm* — Haynes and Boone, LLP (57) ABSTRACT

Methods and systems for fictitious account generation on detection of account takeover conditions are described. A login attempt may be detected and determined to indicate fraud, such as when the login attempt is accompanied by many failed login attempts or is from an untrusted or known malicious endpoint. A fictitious account may be generated, which may include falsified account data and may limit account functionality to prevent unauthorized and fraudulent use of the account. The computing device that performs the login attempt may be routed and permitted to log in to the fictitious account, where the service provider or another computing entity may then monitor activity and usage of the fictitious account by the potentially malicious party. The fictitious account may be maintained so that other actors using the account may access the account and their activity also monitored.

20 Claims, 5 Drawing Sheets

(56) References Cited

U.S. PATENT DOCUMENTS

| | | | |
|---|---|---|---|
| 2016/0256775 A1* | 9/2016 | Gustafson | A63F 13/493 |
| 2018/0060842 A1* | 3/2018 | Waltermann | G06Q 20/4014 |
| 2018/0225653 A1* | 8/2018 | Vokes | H04W 12/06 |
| 2019/0166141 A1* | 5/2019 | Xu | G06N 20/00 |
| 2019/0260777 A1* | 8/2019 | Mehrotra | H04L 63/1433 |
| 2020/0053121 A1* | 2/2020 | Wilcox | G06F 40/30 |
| 2020/0126094 A1* | 4/2020 | ElHarazi | A61B 5/1172 |

OTHER PUBLICATIONS

L. Catuogno et al., A Honeypot System with Honeyword-driven Fake Interactive Sessions (Year: 2015).*
G. Kontaxis et al., Protecting User Accounts from Password Database Leaks (Year: 2013).*

* cited by examiner

FICTITIOUS ACCOUNT GENERATION ON DETECTION OF ACCOUNT TAKEOVER CONDITIONS

TECHNICAL FIELD

The subject technology generally relates to deterring malicious activity on user accounts, and more particularly, relates to systems and methods that provide fictitious account generation on detection of account takeover conditions.

BACKGROUND

As the volume of sensitive information stored and transacted over the internet continues to increase, the need to protect user accounts becomes critical. Various measures to defend against attacks continue to be developed to improve the security of these accounts. Account takeover may be utilized by hackers to access and fraudulently utilize accounts, as well as steal account data, which may include personal and/or financial data of a user. User credentials may be illicitly obtained in multiple ways, including brute force attacks and through other phishing, keylogging, or other malicious attack. Often, several accounts may be compromised at once, and a hacker may test multiple account credentials while attempting to identify valid credentials.

While organizations have taken measures to improve security (e.g., requiring more robust passwords, using 2-factor authentication, implementing security phrases, etc.), not all measures can prevent bad actors from identifying valid credentials and illicitly using those credentials to interact with user accounts that are not their own. Furthermore, once a bad actor has "broken into" an account, shutting the bad actor out by resetting the credentials prevents the bad actor from logging into that particular account again, but does little to prevent future attacks. Thus, improvements in electronic account security are needed for mitigating future attacks.

SUMMARY

According to various aspects of the subject technology, a system for using fictitious accounts to track account usage data during an attempted account takeover is described. An account login attempt is detected from a computing device and it is determined that the account login attempt indicates fraud. In response to the determining that the account login attempt indicates fraud, a fictitious account that provides limited account functionality is determined. The computing device is permitted to log in to the fictitious account and account usage data of the fictitious account is monitored.

According to various aspects of the subject technology, a method for using fictitious accounts to track account usage data during an attempted account takeover is described. A login request comprising login credentials is received from a computing device. It is then determined that the login request is for a fictitious account previously created for the login credentials that indicated fraud. Access to the fictitious account by the computing device is provided and activity of the fictitious account conducted through the computing device is monitored. The activity with the fictitious account is stored with the login credentials.

According to various aspects of the subject technology, a non-transitory machine-readable medium having stored thereon machine-readable instructions executable to use fictitious accounts to track account usage data during an attempted account takeover is described. A fake account for monitoring account usage when a login attempt indicates fraud is generated. The login attempt that indicates fraud is detected from a computing device and the fake account for the login attempt is identified. The computing device is permitted to log in to the fake account and the account usage of the fake account is monitored.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Personal electronic devices (e.g., smartphones, desktops, tablets, laptops, etc.) are used for a variety of purposes including but not limited to real-time communications, financial transactions, and the transmission of or sharing of data. Many of these activities are provided through digital accounts that allow for electronic activities and interactions with other online entities. User accounts may be generated with account credentials, which provide authentication that the user is who the user claims to be, in order to perform these activities. These accounts also contain sensitive information (e.g., personal information, financial information, etc.), which become targets for unscrupulous activity.

One common technique employed by hackers to compromise accounts and perform fraudulent activities or steal sensitive data is account takeover. Account takeover occurs when hackers use illicitly obtained credentials to log into accounts of other users. In order to steal authentication credentials, the hackers are required to verify the credentials, which may occur in a number of ways. Often, compromised credentials may be collected by a malicious actor through various malware, phishing, or other fraudulent means. The compromised credentials may be sold to another malicious actor or used by that first actor to attempt account takeover. However, not all credentials may be valid. Thus, mass account checker tools may be used to automate and perform large-scale login requests directed against web or native applications using stolen credentials (e.g., username and password pairs).

Advancements in computing power have only made it easier for hackers to try larger collections of credentials over a shorter period of time, and thus more likely for hackers to come across a username/password pair that works for an account. While tools have been developed to inhibit high-volume attacks, few tools are directed to providing counter-measures after an account has been infiltrated. Typically, when an account takeover is discovered, or when the account is known to have been compromised, the account password is typically changed, or the account is otherwise locked down to prevent further losses at the hands of bad actors. Once the credentials possessed by the bad actor are no longer useful, no further action is taken.

Tracking illicit activity of the bad actors on accounts identified as having been compromised, however, may provide useful information. Such activity may be tracked if the bad actor believes he has successfully infiltrated an account, but instead has been routed or permitted to login to a separate account and infrastructure that prevents loss to the service provider providing the account or to a user targeted for the account takeover, while imitating account data and account services that the bad actor wishes to fraudulent access and use. This allows the service provider to determine what bad actors are attempting to do during an account takeover and implement better account security protocols, reduce account takeover occurrences, and prevent unauthorized account and platform usage. This reduces abuse of the service provider's online platform and theft of their stored data. Moreover, other malicious or fraudulent entities using the service provider's platform may be identified based on usage of the account, so that loss is further reduced.

In order to monitor and track fictitious account usage by a malicious entity during an attempted account takeover, the service provider providing accounts to users (or another entity providing fictitious account service to the service provider) may first detect an attempted login, and determine the attempted login indicates fraud. The login attempt may indicate fraud when a computing device attempting the login attempt is detected as utilizing an account checker tool that performs mass account login attempts using a list of credentials (e.g., usernames and passwords), a process also known as credential stuffing. This may be determined when the computing device or online address has a number of failed login attempts (e.g., a number of failed login attempts from the same IP or MAC address), which may be account specific to one account (e.g., a brute force attack) or across many accounts. The account login may indicate fraud when there is a high failure rate of account login attempts from an online platform, such as a merchant website or application that allows for login to the service provider's accounts. For example, a spike in account login attempts, where the failure rate exceeds some threshold may be detected from a merchant or other service provider's online platform such that the account login attempts are likely to be originating from a malicious party using the online platform for credential stuffing. The account login attempt may also indicate fraud where there are a large number of reversed transactions on the online platform due to fraud and/or refund requests. For example, if many users/merchants are requesting reversal of electronic transaction processing on a certain platform due to stolen account credentials, future transaction requests may be considered as potentially fraudulent due to a breach in security or error on that online platform. Thus, fraud indication may be based on data obtained from the login attempt, including device identifiers, IP addresses, location of the device, and the like.

If the account login attempt indicates fraud, a fictitious account may be determined and identified for login in response to the account login attempt. The fictitious account provides access to an account dashboard and/or other account interfaces that display account data. However, the account data may be falsified so as to protect the privacy of legitimate users. Thus, false personal and/or financial data may be displayed, such as a fake username, email address or other contact address, fake account balance, and/or other fake data. In order to appear as though the fictitious account is real, certain data used during the attempted login may be used to generate the fictitious account, such as a username or email address. In certain embodiments, a real account may be identified and utilized as a basis for the false data in the fictitious account, such as by scrambling, obscuring, randomizing, or otherwise hiding the sensitive data while using additional data to form the basis of the fictitious account data. Additionally, the fictitious account and the infrastructure/processing flow provided by the account may also allow limited account functionality and accessible account processes so that the malicious user may be led to believe that the malicious user has access to account usage and activities but may be prevented at the backend from maliciously using such account processes. For example, the fictitious account may pretend that the user may engage in electronic transaction processing to perform payments or transfers of a balance in the account or using a financial instrument stored to the account but may be prevented by a backend process from effectuating such processes.

The fictitious account may be created in real-time as the fraudulent login attempt is detected, or may be previously generated so that the fictitious account may be selected and used during a fraudulent login attempt. Once the fictitious account is available, the computing device may be permitted to access and login to the fictitious account, for example, by routing or directing the login attempt to the fictitious account and the dashboard/interfaces provided by the fictitious account. The fictitious account is given a separate flow that may include additional tracking protocols that can be used to identify the originator of the bad acts, as well as track and monitor account usage data of the fictitious account by the bad actor. The fictitious account may be kept alive so that subsequent login attempts using the same authentication credentials may again access the fictitious account so that if the bad actor transfers the account to another, or later attempts to use the account, the account usage data may be further tracked. The account usage data may include identifying an online or computing address used by the computing device accessing the account (e.g., IP/MAC address for the device), as well as activity taken with the account (e.g., data and/or processes accessed and interacted with). Additionally, a destination device, server, or account for an account process may be identified so that other potential bad actors (e.g., fraudulent merchants or services) that interact with the bad actor are flagged for review. In this manner those other potential bad actors may be barred from using the service provider if they are repeatedly involved in fraud with bad actors.

In some embodiments, the account login that indicates fraud may be a valid login, but otherwise caught up during a large-scale attack or associated with other fraudulent attempts. For example, a user may mistype their password during a credential stuffing attack, and the service provider's system may associate the user's valid (but incorrect) login attempts as being fraudulent. Thus, if a subsequent login attempt from the computing device is valid and does not indicate fraud, the computing device may be permitted to access the real account associated with the valid login attempt. Authentication credentials for the real account may be requested to be updated, which may include usage of another account, device, or a call-in service so that additional security of the account's authentication credentials may be verified. The user may be requested to log out and re-login to the real account using the valid credentials to verify authentication. Thus, if the user is routed to a fake account on accident due to a misspelling of a credential, the user may be requested to log out and resubmit the valid credentials in order to access the real account.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
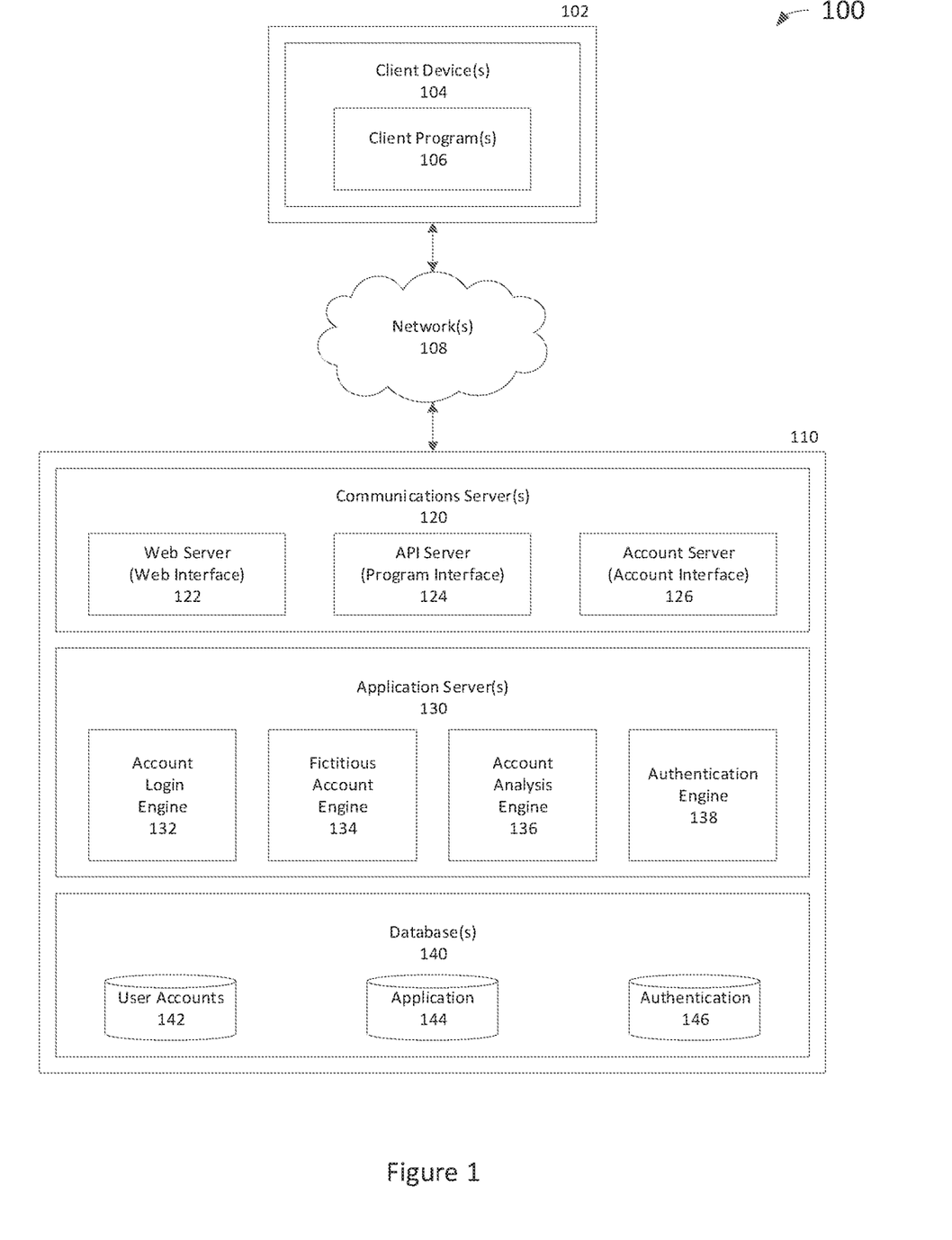
FIG. 1 is a block diagram of an exemplary computing system on which fictitious accounts are implemented and provided to track usage of the fictitious accounts during attempted attacks on user accounts.

FIG. 1 is a block diagram of an exemplary computing system on which fictitious accounts are implemented and provided to track usage of the fictitious accounts during attempted attacks on user accounts. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. Client programs 106 may be used to access, log in to, and/or utilize an account with a service provider associated with system 110, which may include fraudulent accesses. In this regard, client programs 106 may include malicious of fraudulent programs, such as account checker tools for credential stuffing. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or an account server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or an account interface provided by account server 126. It may be appreciated that web server 122, API server 124, and account server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Account server 126 may be arranged to communicate with various account clients and/or applications and may provide an account interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include an account login engine 132, fictitious account engine 134, account analysis engine 136, and/or authentication engine 138. These servers and/or components, which may be in addition to other servers, may be structured and arranged to analyze those accounts that may be subject to malicious activity. For example, account login engine 132 may be utilized to provide account login, as well as track account login data, attempts, and/or activity. Fictitious account engine 134 may be used to generate and provide fictitious accounts that are utilized during account login attempts indicating fraud to collected data on malicious account activity. Account analysis engine 136 may be used to determine account login attempts indicating fraud and monitor account usage data of fictitious accounts. Authentication engine 138 may be used to authenticate users and account logins based on received authentication credentials, as well as other data in some embodiments (e.g., a device fingerprint, two-factor authentication process, etc.).

Application servers 130, in turn, may be coupled to and capable of accessing one or more databases 140 including user accounts database 142, application database 144, and/or authentication database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments. Databases 140 may further store information for fictitious account usage during an attempted account takeover, such as the fictitious accounts, false data for the accounts, and monitoring account usage using the fictitious accounts.

Figure 2:
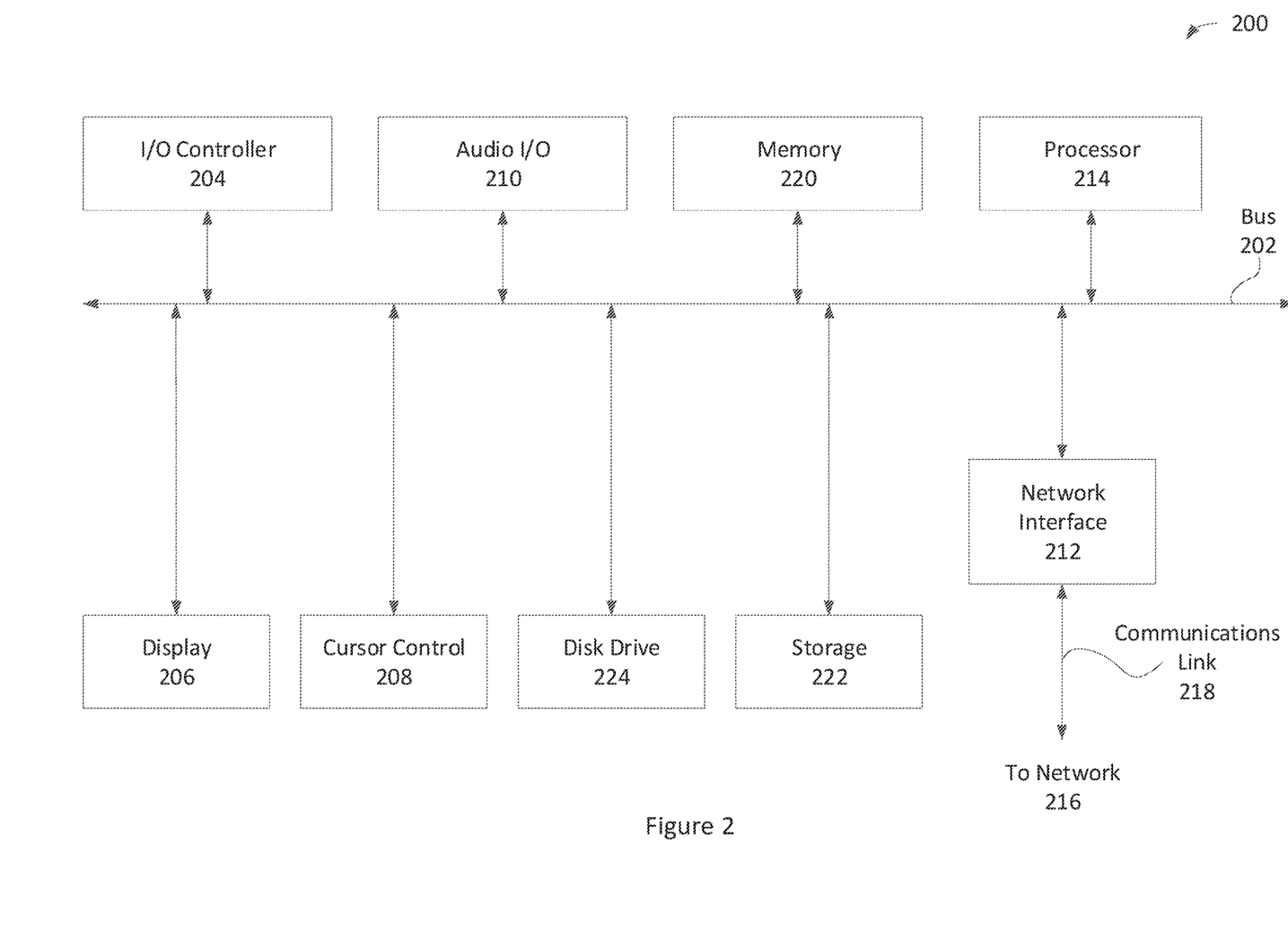
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

In order to defend against account takeovers, illicit activity of the bad actors attempting to perform account takeovers may be tracked so that information may be garnered to prevent future incidents. In order to track such activity, the bad actor must believe he has successfully infiltrated an account, and that he has not been detected. For example, when a hacker attempts to log in with credentials that the hacker presumes have been maliciously obtained and compromised, the hacker must believe they have accessed the account and are able to illicitly use the account. Thus, instead of shutting the hacker out with a failed authentication request, the hacker may be routed to a separate infrastructure that inspects the hacker's activity more thoroughly.

Figure 3:
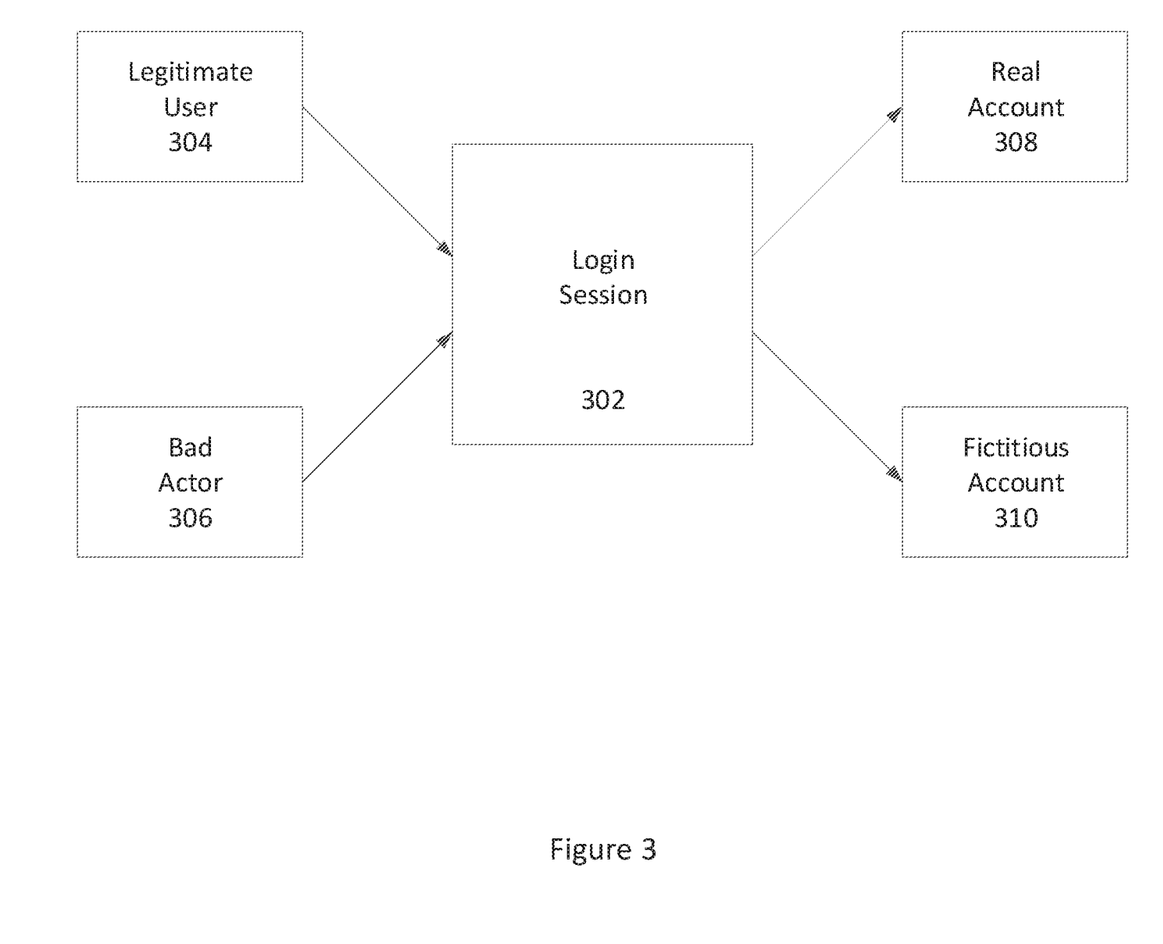
FIG. 3 illustrates a login flow for directing bad actors to fictitious accounts used to track usage of the fictitious accounts during attempted attacks on user accounts.

FIG. 3 illustrates a login flow for directing bad actors to fictitious accounts used to track usage of the fictitious accounts during attempted attacks on user accounts. In an exemplary embodiment, when a login session 302 is initiated on the system, the account login engine 132, account analysis engine 136, and/or authentication engine 138 determines whether the login client is one of a legitimate user 304 or a bad actor 306. This determination may be made in one of a variety of ways. For example, brute force attacks may be identified by many login attempts originating from a single (or relatively low number of) endpoints, which may check multiple accounts or a single account. Additionally, the login client may be identified as using an account checker tool for the account login attempt, such as if the login client is attempting a large number of logins for multiple accounts/credentials. In other embodiments, the login attempt may occur through another online platform where the account is used, and the platform may have a spike or surge in login attempts, failed login attempts (e.g., invalid credentials), and/or reversed/fraudulent actions, such as processed transactions.

Once the determination is made, the login client may be directed to one of two infrastructures. When the login client is determined with some degree of certainty to be legitimate user 304, the login client is directed to real account 308 corresponding to the credentials provided. Real account 308 may provide normal account usage and monitoring of a real account with the service provider such that legitimate user 304 may utilize their account as they normally would. Thus, real account 308 provides all the normal functionalities of a user account with no limitations. In some embodiments, real account 308 may be similarly monitored in case of a potential account takeover, and additional security measures may be implemented (e.g., requesting password reset during an attack, notifying a secondary device or account of the login, or other security measure).

If, however, the login client is determined to be bad actor 306, the login client is then routed to a fictitious account 310 and permitted to login to fictitious account 310 using the credentials supplied with the login request. Fictitious account 310 is one that mimics real account 308 or the data and/or functionality provided by real account 308, but does not provide some or all of connectivity, functionality, and/or account processes that are provided by an actual account. In other words, from a user experience perspective, fictitious account 310 appears to function similarly to an actual account (e.g., real account 308). However, fictitious account 310 has fake or falsified account data and processes that limit or prevent theft of real data and/or abuse of account processes (e.g., electronic transaction processing). Thus, any interaction bad actor 306 may have with fictitious account 310 is fabricated by the system and monitored to determine account usage data by bad actor 306.

In some embodiments, fictitious account 310 provides access to an account dashboard interface, which may include information such as fake personal and/or financial information, a fake account balance, or other falsified data. The falsified data may be entirely randomized or generated, generated based on administrator input, or use data for real account 308 (or one or more other accounts) by scrambling sensitive data. In some embodiments, user information of fictitious account 310 is partially or completely fictitious. For example, if bad actor 306 is attempting to log on as a John Smith (e.g., john.smith@abc.com or an account belonging to a John Smith), the system will provide certain details that relate to John Smith, such as the name and age, but will fabricate the remainder of the user information, such as social security number and birthdate. Thus, while bad actor 306 is led the believe he has successfully infiltrated John Smith's account, none of the information provided by fictitious account 310 is sensitive in nature, and just enough information is provided in fictitious account 310 to maintain a level engagement of bad actor 306 so that certain information of bad actor 306 may be tracked in order to help stymie future hacks of similar nature.

Moreover, login information provided during login session 302 may be presented in an interface of fictitious account 310 to appear valid. Thus, fictitious account may be generated and/or updated (e.g., from a previous generated fake account) in real-time during the fraudulent login attempt. Fictitious account 310 may also provide for certain account processes that are fake or "pretend processes," where the processes pretend to provide account functionality and processes, but are limited or prevented at a backend processor from effectuating the actual process and any change to another account or service. For example, an electronic transaction processing request may be submitted for a payment or transfer using fictitious account 310, which may appear to go through and a fake transaction history or falsified processing report may be output and accessible through fictitious account 310 without actual transferring of funds. Other types of limited functionality that is faked may be funding source usage or lookup, transaction history lookup, and/or account information lookup.

Once bad actor 306 accesses fictitious account 310, account usage data may be monitored and tracked to better identify future malicious acts and prevent loss. Thus, a service provider process may begin tracking data of how the account is used, which may include accessed data, used processes, and destination entities for various account processes. An IP address or MAC address associated with a device or server using the account may be identified and tracked as bad actor 306 to prevent further loss to the same entity (e.g., by blacklisting the device from other account accesses). Additionally, merchants, users, devices/servers, or service providers that are the destination for account processes (e.g., a payment or transfer) may be flagged for internal review as to whether those entities also constitute a bad actor and should be blacklisted or referred to an authority for inspection.

Figure 4:
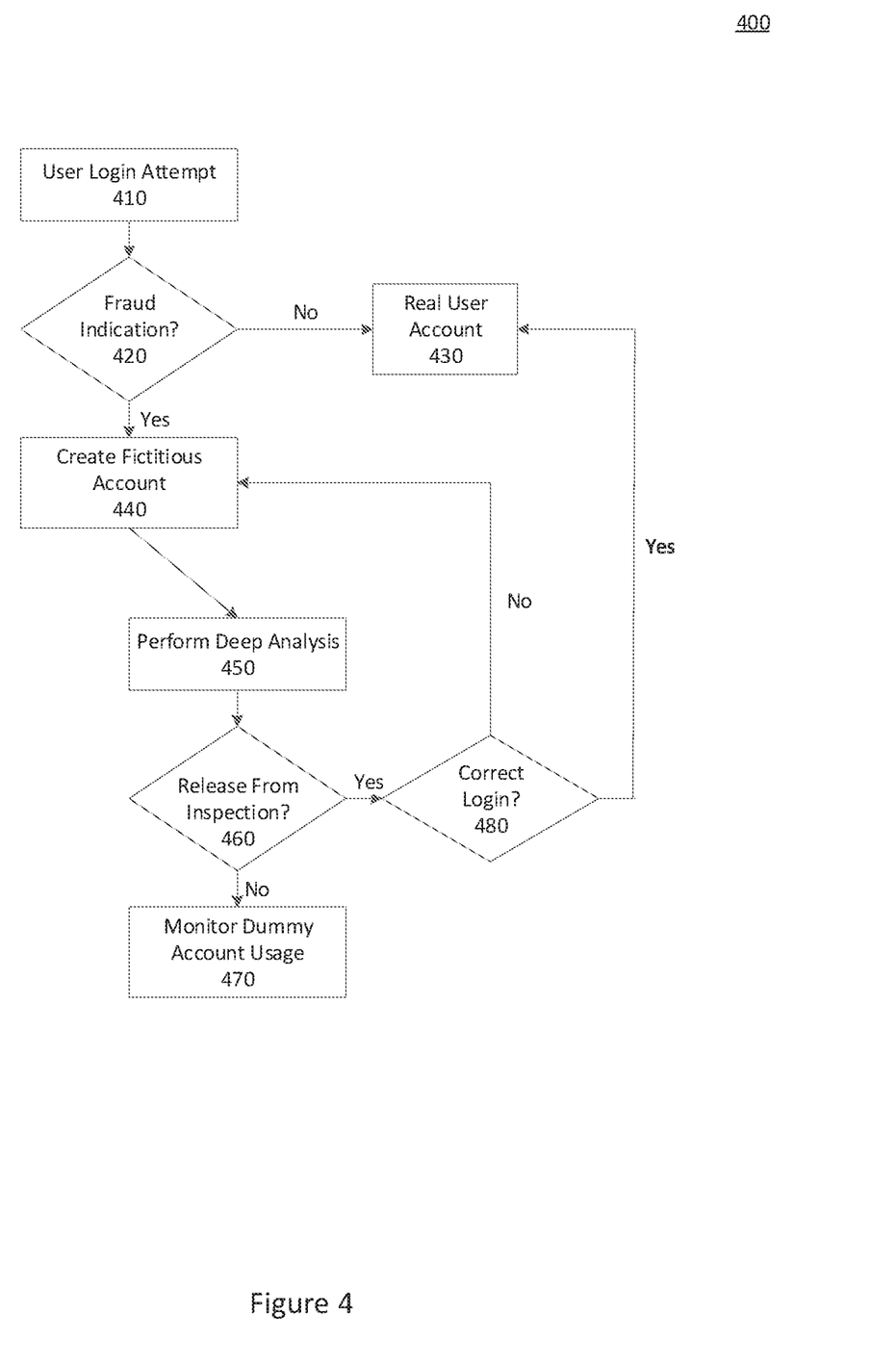
FIG. 4 illustrates an exemplary process 400 for implementing fictitious accounts used to track usage of the fictitious accounts during attempted attacks on user accounts.

FIG. 4 illustrates an exemplary process 400 for implementing fictitious accounts used to track usage of the fictitious accounts during attempted attacks on user accounts. At operation 410, a user login attempt is initiated via a client computing device. When a login session 302 is initiated using account login engine 132, the system needs to determine the legitimacy of the user of the client computing device, as shown in operation 420. Generally, an authentication process is used to determine the legitimacy of a user. For example, when credentials (e.g., a username/password pair) are entered, the system makes a determination as to whether the credentials match one of the accounts and that the password is correct (e.g., by authentication engine 138). If the credentials are proper and account login engine 132 with account analysis engine 136 and authentication engine 138 do not determine that the login attempt indicates fraud, the client computing device is directed to a real user account in operation 430.

Conversely, if the username/password pair is incorrect, the user of the client computing device may be illegitimate. Under conventional systems, the only determination that is made is whether credentials entered are correct or not. An incorrect entry of credentials results in a denial of access that is typically accompanied by a prompt indicating that the credentials are incorrect and that the user should try re-entering the credentials. Process 400, on the other hand, proceeds to make a determination as to whether there is an indication that the login attempt in operation 410 indicates fraud at operation 420 using account login engine 132 with account analysis engine 136 and authentication engine 138. If so, then it is determined that the login attempt is illegitimate and instead of denying access, a fictitious account may be provided for the login by the potentially malicious user so that account activity by the potentially malicious user may be tracked.

Examples of metrics that may be used to determine whether the user of the client computing device is illegitimate (i.e., a bad actor) include the detection of a known bad internet protocol (IP) address or visitor identification (VID). Also, the user's behavior on the client computing device, as well as the operating system run by the client computing device may be signals that are considered by the decision-making process. These metrics may be used to produce a risk rank. A risk rank that exceeds a predetermined level will suggest that the user of the client computing device is illegitimate. Other factors influencing the risk rank may include a large number of login attempts from a certain device, server, or other online entity, an indication of an account checker tool being utilized by the entity, an account login attempt from online platform being used for or suffering from abuse (e.g., being used from account checker tool processes or compromised such that multiple fraudulent login attempts or occurring through the platform), or a notice of account abuse from a particular online entity or for a particular account.

In some embodiments, an additional check is performed before a client computing device that submits the wrong credentials gets diverted to a fictitious account that may be previously generated or generated in real-time during submission of authentication credentials. For instance, a legitimate user may accidentally mistype his credentials into the client computing device. In this instance, it would be disadvantageous to direct the user to a fictitious account as their account usage data is not fraudulent. Accordingly, the system may determine whether the account login attempt indicates fraud to a degree (e.g., meeting or exceeding some threshold risk or fraud indication) that the system is confident that the login attempt is fraudulent and indicates an attempted account takeover. In some embodiments, certain accounts may be flagged as accounts that may have been subject to potential fraud, such as account users having indicated their accounts have been compromised. That is, when the legitimate user believes his account has been hacked, he can notify the organization to which his account belongs that he needs his password reset. The system may also determine which account may have been compromised due to a recent malicious act by an actor (e.g., due to phishing or malware activities or when a systems servers or databases become compromised). The system's organization may obtain a list of account credentials that may have been compromised through a variety of means and distributed publicly. Examples of this include files posted on various forums and credentials that are exposed and made available via reported breaches (e.g., credential dumps on social media, open forums, and dark web marketplaces). While the list of credentials may not include any that actually match to ones within the specific organization, if a person (e.g., a device, server, or other online entity that may be identified using an online address or identifier) utilizes such credentials from that list, this may be an indication that that person is not a legitimate user. Thus, even if the credentials do not correspond to an account within the organization, a fictitious account may be created and utilized during the login attempt using the compromised credentials in order to track the activity of the user attempting to use the credentials.

Additional indications that an account may have been hacked may include the type of activity the user engages in once he has infiltrated another user's account. For example, the user may attempt to change the associated email address and/or the password so that the actual owner of the account cannot access the account. Such activity, when coupled with other unscrupulous activity, provides a strong signal that the account has been taken over by a bad actor. The next time the suspected bad actor attempts to log into the account, he may be diverted to a fictitious account instead. The actual owner may further be informed of this activity and may be provided an option to reset his password or have his password reset automatically. When suspicious activity is detected by the system, the owner of the account may be subject to a verification process, such as an authentication process (e.g., answer security questions, enter a code provided by organization via email or phone, etc.), to prove his identity. Once verified, the owner may continue to interact with the actual account, while the bad actor may instead be directed to interact with the fictitious account. As such, two similar accounts may exist concurrently, where one is the actual account and may be logged in to using the new password, and the other is the fictitious account created for the bad actor that may be accessed using the credentials the bad actor supplied or changed during the account takeover.

Thus, if there is an indication that the login attempt is fraudulent at operation 420, process 400 may advance to operation 440 where a fictitious account is generated. In some embodiments, the fictitious account may be generated in real-time based on the bad actor and the provided credentials being used for the account takeover. The fictitious account may be generated so that account data may mirror the credentials and/or other data provided by the bad actor during the login attempt (e.g., a location or network address provided with the login attempt). The fictitious account may also be previously generated prior to the login attempt in order to act as a "honeypot" type security measure and may be identified and accessed at operation 440.

The fictitious account may be created for a small number of fraudulent login attempts so that a number of bad actors may be monitored or the actions with multiple accounts by the bad actor may be tracked. For example, during credential stuffing using an account checker tool, a large number of potentially compromised credentials may be used (e.g., thousands or more), where it would be operationally intensive to attempt to monitor every login attempt indicating fraud. Thus, the organizations system may generate a small number of fictitious accounts (e.g., a few hundred or less) that are used to monitor the bad actor(s).

Process 400 may continue to operation 450 where a deep analysis is performed in order to determine whether the computing device accessing the fictitious account is a bad actor and what the bad actor is attempting to do with the account. The deep analysis may include de-anonymization techniques that attempt to detect if the bad actor is attempting to mask their location by connecting via a proxy and may attempt to determine an actual location of the bad actor. The actions, such as account data access, credential changing, account processes, and/or processing requests (e.g., for an electronic transaction, such as a payment or transfer of funds) may be monitored to determine the intentions of the bad actor. The fictitious account may provide an account dashboard that displays account data and allows the bad actor to interact with the system as a legitimate actor would with a real account. For example, the system may direct the fictitious account to a flow that imitates the real processes of the organization and pretends to allow the fictitious account to perform such processes. However, a backend processor of the system may prevent such processes from being implemented or affecting a change on other real accounts and/or platforms. For example, a falsified processing report for a payment or transfer may be provided based on a transaction processing request.

The deep analysis may also track the endpoints or other entities that the bad actors attempts to interact with using the fictitious account to determine whether those entities are also bad actors and may be involved in fraudulent processes. The deep analysis could perform tests to determine if the user is a legitimate user, a bad actor performing credential stuffing, or some script-based automated attack (e.g., by performing statistical analysis on mouse click timings). This deep analysis could also include device fingerprinting, or the gathering of multiple metrics about the device (e.g., canvas information, browser version, etc.). If the user is determined to be a bad actor, the results of this deep analysis can be used to both enhance the current security controls that are in place and to assist future possible involvement with legal authorities.

After performing the deep analysis in operation 450, the system may determine whether the client computing device is to be released from inspection in operation 460. If the computing device still indicates that a user is fraudulently utilizing the fictitious account, process 400 may continue to operation 470 where the system continues to monitor usage of the fictitious account. For example, the fictitious account may remain viable and accessible using the credentials provided during the fraudulent login attempt, and the bad actor or another bad actor that obtains the credentials may access the fictitious account using those credentials. For example, the fictitious account that the bad actor believes is real may be sold or transferred to another that may utilize the account for illegitimate means. The system may then determine data for the bad actor(s) during these additional account usages. This may allow for more deep analysis into the actions of the bad actors so that the bad actors may be identified, and security may be increased.

However, a legitimate user may also be routed to a fictitious account in response to certain data that indicates fraud but is actually legitimate, such as a login from a new or unrecognized device. During the performance of the deep analysis, the system may determine that the presumably illegitimate user is the owner/authorized user of the account. As such, the system may release the client computing device from the fictitious account in operation 460, and then prompt the user to input his credentials once again. If the system determines in operation 480 that the credentials are proper, then the client computing device is returned to the real user account. If the system determines that the credentials are improper, then the client computing device is routed to the fictitious account again, where more information may be collected on the user.

Figure 5:
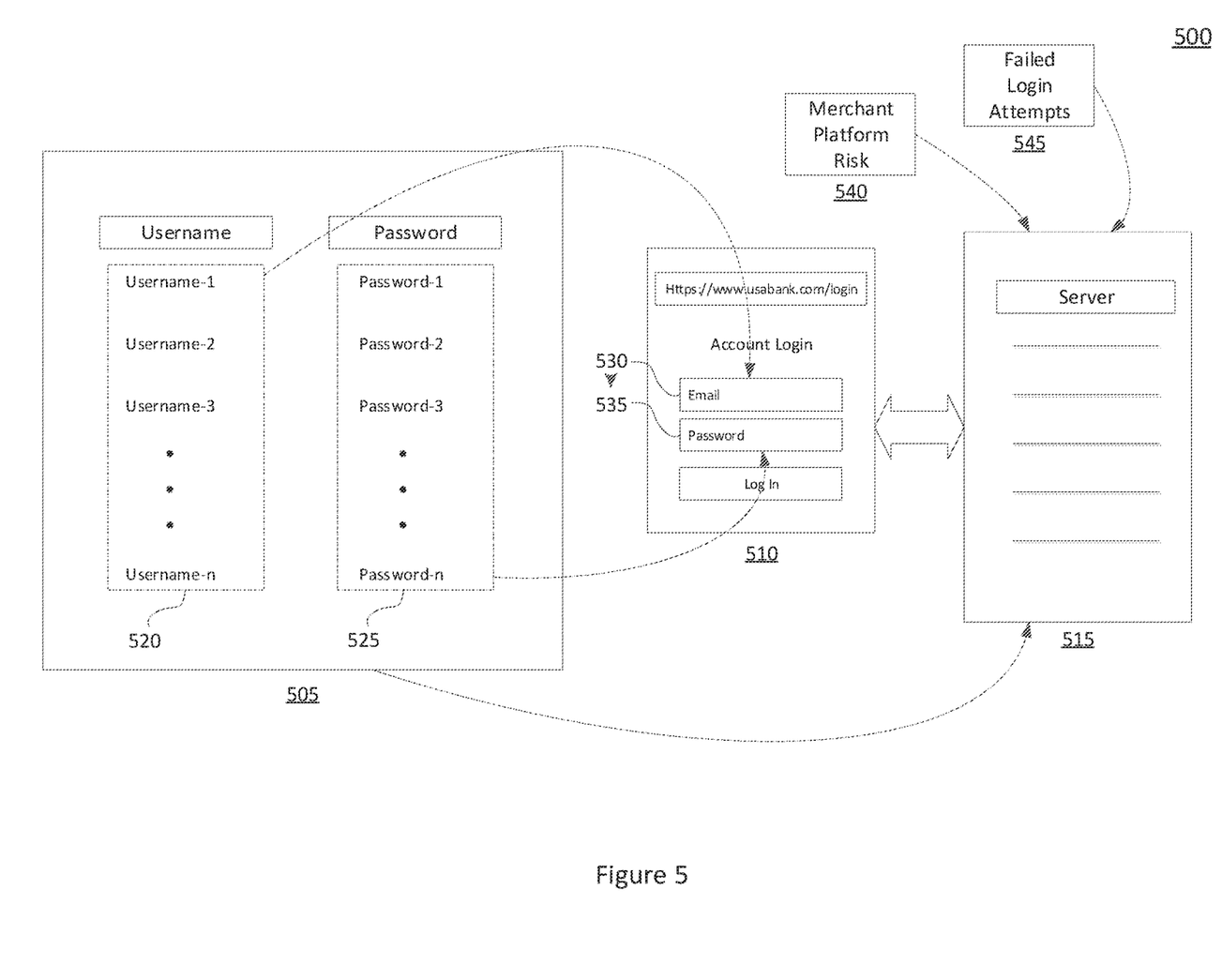
FIG. 5 provides an illustrative depiction of a mass account checker tool for credential stuffing on a computing device within a network of computing devices.

FIG. 5 provides an illustrative depiction of a mass account checker tool for credential stuffing on a computing device within a network of computing devices. A bad actor may utilize an illicitly obtained list of credentials 505 to attempt logins on a web browser 510 running on a client computing device. The web browser is communicatively coupled to a server 515 via a network connecting the client computing device to server 515. Web browser 510 is shown as accessing exemplary website hosted by server 515 through an exemplary web address meant for simplicity of discussion below.

In this example, a username 520 and a password 525 pairs are individually tried in a username entry box 530 and a password entry box 535 on the web browser 510. This may be done by processing list of credentials 505 with an account checker tool that provides mass account logins to test each of the pairs of a user name 520 and a password 525, known as credential stuffing. In this manner, a bad actor may quickly process long lists of potentially compromised credentials and determine credentials that are compromised so that the bad actor may perform an account takeover. Server 515 may include one or more security processes to detect credential stuffing attempts, which may include determining a spike in login attempts from another online platform or through a particular online entity (e.g., device or server) and/or a number of failed login attempts exceeding a threshold or common number of failed logins over a time period.

Thus, when server 515 detects that web browser 510 of the client computing device attempts a login, server 515 makes a determination whether the client computing device is being operated by a legitimate user. As discussed above, this may be detected by determining that the client computing device is running an account check program or is otherwise behaving fraudulently, including using an account known to be compromised. The client computing device may also be known to be a fraudulent device, such as based on previous activity. Thus, when the client computing device is determined to be operated by an illegitimate user (i.e., a bad actor), web browser 510 may be directed to an account dashboard for a fictitious account. The fictitious account may be generated in real time during entry of user name 520 and password 525 to username entry box 530 and password entry box 535 or may be previously generated and used during the fraudulent account login.

Since bad actors using techniques like credential stuffing rely on the ability to try a large number of credentials, creating fictitious accounts for some of those accounts will slow down the infiltration process because the bad actors will not know that the account they believe they have gained access to may be a fictitious account. If, hypothetically speaking, 10,000 credentials are tried and 300 fictitious accounts are created and used, the bad actor would need a significant amount of time to pursue each of the 300 "leads" that is generated by a seemingly successful login to fictitious accounts. Thus, by creating these fictitious accounts and routing the bad actor to these accounts during a credential stuffing attempt, bad actor cannot tell whether they are actually breaking into a fictitious account, or if they are logged into the actual account.

Moreover, after the bad actor believes that they have successfully performed an account takeover of an account based on logging in to the fictitious account, the bad actor may continue to use the account in a fraudulent manner. The actions of the bad actor with the account may be tracked so that account security may be increased, and other bad actors may be identified. For example, the account may be transferred to another that attempts to fraudulently use the account, and the other user/device may be identified and tracked as another bad actor. The account may also be used to attempt fraudulent transactions on a merchant platform that is complicit in the fraud, and the merchant platforms or other online entities that are also bad actors may be identified.

In some embodiments, the list of known compromised credentials may be obtained in the same manner that bad actors obtain them, such as from online forums and illicit marketplaces. In addition to relying on illicitly obtained lists of credentials, the server may also determine a merchant platform risk 540 that indicates that the merchant platform is behaving unusually. For example, a merchant platform may be accessed using web browser 510, and username entry box 530 and password entry box 535 provided through an interface of the merchant platform may be used by the account checker tool for credential stuffing. Thus, server 515 may determine merchant platform risk 540 exceeds a threshold risk level based on a spike in login attempts and/or login failures through the merchant platform. Additionally, based on monitoring fictitious accounts, merchant platforms involved in fraud may also be identified, and merchant platform risk 540 may also be determined based on the identified fraud.

Alternatively, certain activity (e.g., activity typically engaged in by bad actors) may be identified based on failed login attempts 545 from a particular device, within a certain area, or within a certain time period. This may cause a client device performing a failed login during failed login attempts 545 to be routed to a fictitious account on which the use may be tracked. Additionally, if the login attempt is actually valid, deep analysis may be performed to identify that the failed login attempt was legitimate and reroute the client computing device back to the user's real account. The user may also be recommended to change or update authentication credentials, or otherwise secure their account. However, if usage of the fictitious account continues to indicate fraud, account usage may continue to be monitored. The information garnered from the tracking of illicit activity may be used to prevent future incidents.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system comprising:
   a non-transitory memory storing instructions; and
   one or more hardware processors coupled to the non-transitory memory and configured to read the instructions from the non-transitory memory to cause the system to perform operations comprising:
   detecting an account login attempt from a computing device;
   determining that the account login attempt indicates fraud;
   determining, in response to the determining that the account login attempt indicates fraud, a fictitious account that provides limited account functionality;
   permitting the computing device to log in to the fictitious account; and
   monitoring account usage data of the fictitious account, wherein the monitoring comprises:
      receiving a transaction processing request,
      generating imitation account data for the transaction processing request using the fictitious account, wherein the imitation account data displays a fake completion of the transaction processing request without processing a payment for the transaction processing request,
      outputting a user interface that displays the imitation account data as the fake completion of the transaction processing request,
      detecting a response to the imitation account data in the user interface, and
      adjusting the imitation account data based on the response.

2. The system of claim 1, wherein the determining that account login attempt indicates fraud is based on at least one of identifying that the computing device is utilizing an account checker tool for the account login attempt, determining a number of failed login attempts from the computing device, determining a failure rate of account login attempts on an online platform associated with the account login attempt, or detecting a number of reversed transactions on the online platform with the system.

3. The system of claim 1, wherein the fictitious account provides access to an account dashboard interface with the system, and wherein the fictitious account provides false personal information and financial information in the account dashboard interface.

4. The system of claim 1, wherein the operations further comprise:
   determining a real account corresponding to the account login attempt; and
   generating the fictitious account based on the real account.

5. The system of claim 4, wherein the fictitious account is generated based on the real account at one of a previous time prior to the account login attempt or after the determining that the account login attempt indicates fraud.

6. The system of claim 1, wherein the account login attempt is selected from a plurality of account login attempts indicating fraud, and wherein monitoring the account usage data comprises at least one of:
   determining at least one of an IP address or a MAC address associated with the computing device during use of the fictitious account; or
   identifying at least one of a destination account or a destination device for electronic transaction processing using the fictitious account.

7. The system of claim 1, wherein the operations further comprise:
   providing a falsified processing report for the fake completion of the transaction processing request within a dashboard associated with the fictitious account.

8. The system of claim 1, wherein the operations further comprise:

determining a subsequent account login attempt is a valid login attempt based on the monitoring the account usage data; and logging the computing device into a real account associated with the subsequent account login attempt.

9. The system of claim 8, wherein the determining that the account login attempt indicates fraud comprises receiving a plurality of failed logins for the real account prior to the receiving the account login attempt, wherein the account login attempt comprises a valid login, and wherein the operations further comprise:

requesting that the computing device re-login to the real account in a dashboard interface provided by the fictitious account.

10. The system of claim 1, wherein the fictitious account is generated using a login name or a login email address utilized for the account login attempt, and wherein the login name or the login email address is displayed in an account dashboard for the fictitious account.

11. The system of claim 1, wherein the limited account functionality comprises at least one of electronic transaction processing services, funding source usage processes, account transaction history lookup, or account information lookup.

12. A method comprising:

receiving a login request comprising compromised login credentials from a computing device;

determining, for the login request, a fictitious account associated with the compromised login credentials;

providing access to the fictitious account by the computing device;

monitoring activity of the fictitious account conducted through the computing device, wherein the monitoring comprises:

receiving a transaction processing request, generating imitation account data for the transaction processing request using the fictitious account, wherein the imitation account data displays a fake completion of the transaction processing request without processing a payment for the transaction processing request, outputting an interface that displays the imitation account data as the fake completion of the transaction processing request, detecting a response to the imitation account data in the interface, and adjusting the imitation account data based on the response; and storing the activity with the fictitious account for the compromised login credentials.

13. The method of claim 12, wherein the fictitious account was created in real-time during a previous login request having the compromised login credentials.

14. The method of claim 13, wherein the previous login request was one of a plurality of previous login requests identified as being performed using a mass account checker tool.

15. The method of claim 12, further comprising:

displaying a fake balance sheet within the interface accessible using the fictitious account, wherein the fake balance sheet falsifies data from a real account.

16. The method of claim 12, further comprising:

blocking the fictitious account from performing an account action with a backend service provider process.

17. The method of claim 12, wherein the fictitious account is one of a plurality of fictitious accounts created prior to a previous login request having the compromised login credentials that indicated fraud.

18. A non-transitory machine-readable medium having stored thereon machine-readable instructions executable to cause a machine to perform operations comprising:

generating a fake account for monitoring account usage when a login attempt indicates fraud;

detecting the login attempt that indicates fraud from a computing device;

identifying the fake account for the login attempt;

permitting the computing device to log in to the fake account; and monitoring the account usage of the fake account, wherein the monitoring comprises:

receiving a transaction processing request, generating imitation account data for the transaction processing request using the fake account, wherein the imitation account data displays a fake completion of the transaction processing request without processing a payment for the transaction processing request, outputting an interface that displays the imitation account data as the fake completion of the transaction processing request, detecting a response to the imitation account data in the interface, and adjusting the imitation account data based on the response.

19. The non-transitory machine-readable medium of claim 18, wherein the login attempt indicates fraud when an account login failure rate from an online sales platform exceeds a failure rate threshold.

20. The non-transitory machine-readable medium of claim 18, wherein the monitoring the account usage comprises determining an online merchant that the fake account attempts to interact with, and wherein the operations further comprise:

flagging the online merchant for internal review.

* * * * *